United States Patent
Falwell et al.

(10) Patent No.: US 6,233,838 B1
(45) Date of Patent: May 22, 2001

(54) APPARATUS FOR HOLDING, LOCATING AND DISPENSING ELECTRICAL BOXES

(76) Inventors: Robert L. Falwell, 3425 E. Wilton St., Long Beach, CA (US) 90804; Edward J. Kramer, 79 Pecksuot Rd., North Weymouth, MA (US) 02191-1611; George H. Banker, 5126 Arvada St., Torrance, CA (US) 90503; Donald L. Masho, 22 O'Callaghan Way, Lynn, MA (US) 01905-1399; Ira G. Goltz, 162 ½ Prospect, Long Beach, CA (US) 90803

( * ) Notice: Subject to any disclaimer, the term of this patent is extended or adjusted under 35 U.S.C. 154(b) by 0 days.

(21) Appl. No.: 09/191,001

(22) Filed: Nov. 12, 1998

(51) Int. Cl.[7] .............. G01B 1/00; G01D 21/00
(52) U.S. Cl. ............. 33/528; 33/613; 33/DIG. 10; 269/904
(58) Field of Search .............. 33/528, DIG. 10, 33/613; 269/904

(56) References Cited

U.S. PATENT DOCUMENTS

| | | | |
|---|---|---|---|
| 2,919,913 | * 1/1960 | Phair ............................... | 33/613 |
| 3,436,070 | * 4/1969 | Utley ............................... | 33/528 |
| 3,875,669 | * 4/1975 | Hull ............................... | 33/528 |
| 4,479,639 | * 10/1984 | Kane ............................... | 33/613 |
| 4,750,271 | * 6/1988 | Ericksen ............................... | 33/613 |
| 4,791,731 | * 12/1988 | Dickinson et al. ............................... | 33/528 |
| 4,850,115 | 7/1989 | Price et al. ............................... | 33/528 |
| 4,890,391 | * 1/1990 | Warren ............................... | 33/613 |
| 5,072,523 | * 12/1991 | Bennett ............................... | 33/528 |
| 5,111,593 | * 5/1992 | Gehen, Sr. ............................... | 33/613 |
| 5,348,274 | 9/1994 | Breen ............................... | 269/3 |
| 5,361,509 | * 11/1994 | Wheeler, Sr. et al. ............................... | 33/528 |
| 5,630,281 | 5/1997 | Pledger et al. ............................... | 33/528 |
| 5,758,430 | * 6/1998 | Holloway ............................... | 33/528 |

* cited by examiner

*Primary Examiner*—Diego Gutierrez
*Assistant Examiner*—Stanley J. Pruchnic, Jr.
(74) *Attorney, Agent, or Firm*—Karin A. Russo

(57) ABSTRACT

A portable cartridge loading apparatus for holding, locating, and individually dispensing electrical junction boxes. The apparatus includes a positioning apparatus for locating the loader on a predetermined building element or stud. The apparatus has devices to locate each junction box in a predetermined depth and height location on each wall, at least two different height locations. The different height installation of each junction box is achieved without setting any other location device, other than repositioning the loading device in a second attitude on the building element or stud.

10 Claims, 9 Drawing Sheets

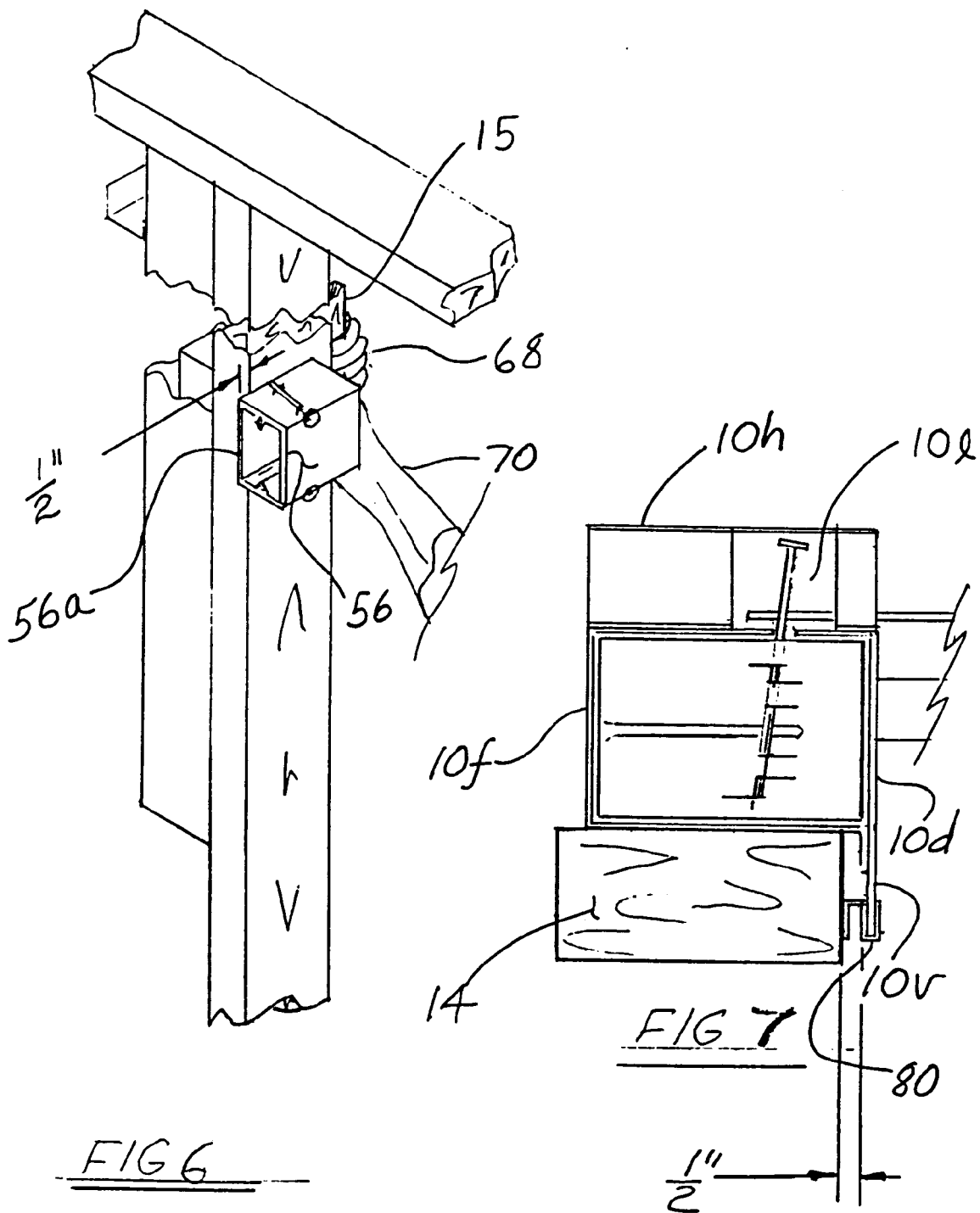

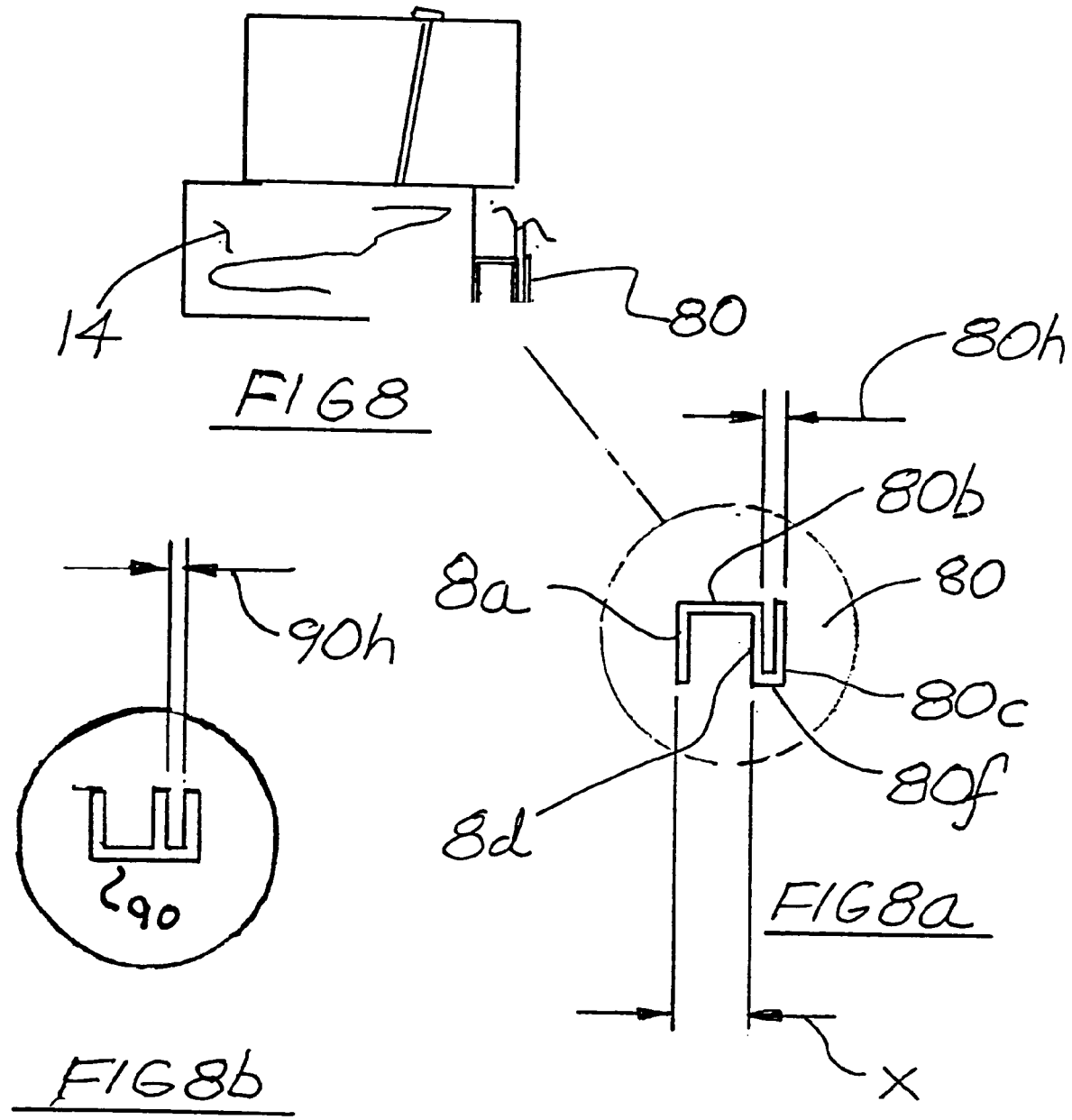

US 6,233,838 B1

APPARATUS FOR HOLDING, LOCATING AND DISPENSING ELECTRICAL BOXES

BACKGROUND OF THE INVENTION

This invention pertains to electrical boxes or junction box installation. There is a need for a better way to handle these electrical components, and to locate them on building structures. To date, there have been many ways documented and described in the prior art to locate such electrical boxes by using a template, or tool that acts like a template. The problem is that there is a great deal of manual handling of the boxes, and of the tool or template used to accomplish the desired installation that will provide accurate electrical box locations according to building codes, and the contractor's specifications. The electrical outlet locations are prescribed by building codes, and generally will be met by adjusting the position of the boxes in three dimensions in order to meet the code requirements. The adjustment by nature of the definition of space must be accomplished in three planes, vertically, by depth with respect to the building wall, and by direct attachment to a surface of the structural members constituting components of the wall.

SUMMARY OF THE INVENTION

The present invention concerns a portable cartridge holding apparatus for locating and supplying electrical junction boxes. The invention is directed to the loading apparatus, and its general elongate receptacle that facilitates loading of up to ten electrical junction boxes at a time. There are operating components associated with the receptacle that function to enable a release of one of the junction boxes to a dispensing chamber. The dispensing chamber has a biasing device to cause each released junction box to be accurately located at a desired depth position with respect to the building wall face. While the actuating components release each junction box, a following junction box of the supply is held in an upper position by another portion of the actuating components.

OBJECTS OF THE INVENTION

It is a primary object of the present invention to facilitate rapid and accurate location of wall mounted junction boxes in three planes of location on a structural building element of a building wall.

It is another object of the present invention to provide a way of holding the junction boxes in place by way of a mechanical positioning apparatus. The boxes will be located, registered and fastened without direct manual manipulation of the boxes. This will result in a repeatable, accurate installation of electrical boxes on a building wall in a desired and predetermined position.

It is another object of the present invention to provide a way of installing electrical junction boxes at two different elevation levels on a building wall. The portable cartridge apparatus is able to provide the different elevation levels without changing any settings of the mechanism included in the portable cartridge apparatus.

It is yet another object of the present invention to greatly reduce the manual labor of positioning junction boxes on building elements of a wall, while increasing the number of boxes installed while effectively reducing the time required to do so.

DESCRIPTION OF THE DRAWINGS

FIG. 2a is an isometric view of a typical junction box, as it is loaded into the portable cartridge apparatus.

FIG. 6 is a partial view taken along the same lines as FIG. 5, showing the upper portion of a building wall, a structural element, and the portable cartridge apparatus in place to locate the upper boxes in an elevated position according to code. The upper end of the cartridge locates the apparatus against the bottom of the top wall plate in this case, thereby providing a desired and predetermined height position of the junction box upon installation.

FIG. 7 is a top view of the portable cartridge apparatus taken along the lines of 7—7 in FIG. 1. This shows the relationship of the building wall element (stud), and the apparatus in place with a corresponding ½ depth space to allow for sheet rock material at final finish of the wall.

FIG. 8 is a top view of the portable cartridge apparatus, taken along the same lines as FIG. 7. This view primarily illustrating the different spacer sizes used to accommodate varying thickness of wallboard installation in a building environment The adjuster is optional, but permits 1" adjustments in heights, of the boxes as may be required by a particular construction site.

FIG. 8a is a slightly enlarged view of the adjusting spacer seen in FIG. 7, illustrating its S shape.

FIG. 8b is a slightly enlarged view of a second adjusting spacer as shown in FIG. 8a, illustrating an alternate C shape.

DESCRIPTION OF THE PREFERRED EMBODIMENT

Figure 1:
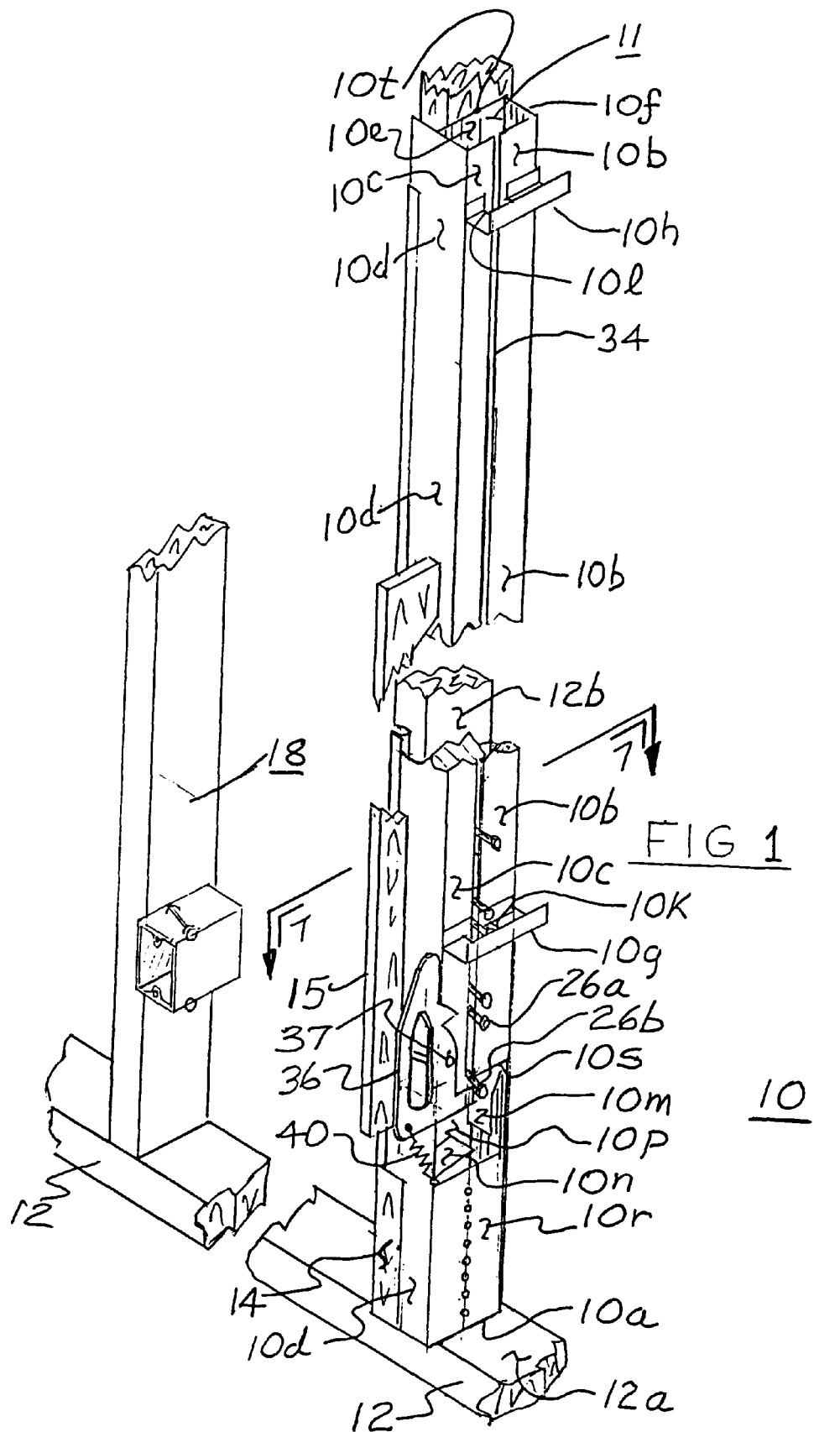
FIG. 1 is an isometric view of the present invention, showing the portable cartridge apparatus (junction box installer) as it is utilized while installing electrical junction boxes in a base location on a structural building member of a building wall.

Referring to FIG. 1, there is shown a portable cartridge apparatus 10 that may otherwise be known as an electrical box installing assembly. The FIG. 1 view illustrates the general attitude of the portable cartridge apparatus 10 as it is positioned against a structural member 14 of a building wall 18. The portable cartridge apparatus 10 is designed to be hand carried, and hand operated. The unit as such requires at least one human band to hold it in place on a structural building member of a building wall during operation.

The portable cartridge apparatus 10 is shown positioned and located adjacent to the structural member 14. In FIG. 1, an end 10a of the portable cartridge apparatus 10 is resting on top of a bottom plate 12 of the wall 18. The apparatus 10 is generally an elongated rectangular shaped receptacle partially resembling a downspout for gutters on a home. The rectangular shape is evident when viewed from either the top or bottom. The portable cartridge apparatus has a general rectangular shaped receiving chamber 11 into which a supply of electrical junction boxes is loaded. An exact number of 10 boxes fit the present design perfectly. The reason for having ten boxes in the unit is so that the overall length of the portable cartridge apparatus 10 will meet installation requirements for two different heights of boxes on a wall. This gives enough room for completing the installation of electrical boxes in two bedrooms of a residence which require the four outlet receptacle boxes and one switch plate per room. This will be explained further in the following specification.

The portable cartridge apparatus 10 is generally fabricated of either a suitable metal like steel, or appropriate alternative aluminum bent portions, extruded aluminum or suitable extruded plastic material. The plastic would be of equitable engineering characteristics with respect to mechanical properties of metal to withstand the necessary manual handling against construction elements by contractors.

The receiving chamber 11 is rectangular shaped to hold within its walls, a supply of 10 electric junction boxes that are stacked one upon the other. In the present case for the purposes of the present specification, the entire elongated rectangular shaped receptacle has been fabricated of aluminum, suitably welded where necessary at flange sections to sufficient contact areas, thereby making a very strong assembly. Details of the construction will be described later in more detail.

Additionally, there are some functional components included within and on the portable cartridge apparatus 10 structure. These will also be described in detail later in this specification Those functional parts are thought to be best made of a suitable metal, or very structurally sufficient plastic having cross sectional strength properties that will form a part comparable to metal fabrication of those parts.

Figure 2:
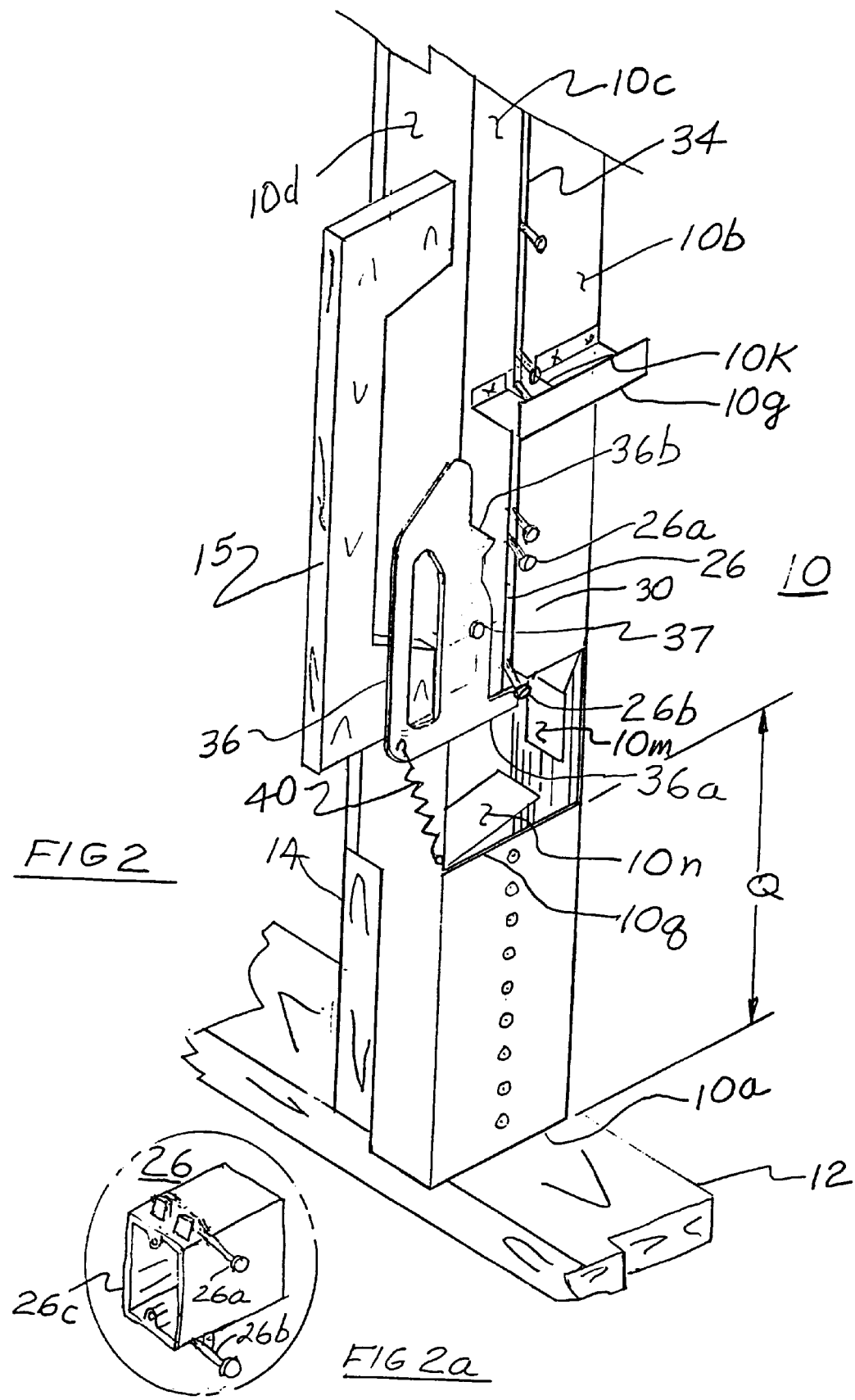
FIG. 2 is a view taken along the same lines as FIG. 1, but at approximately twice the scale as FIG. 1. More detail of the working section of the portable cartridge apparatus is seen in this view, as the unit is located against a building member of a wall. There arm three junction boxes shown in the cartridge assembly, and there is an empty space at the junction box dispensing chamber in this view.
Figures 9, 9A:
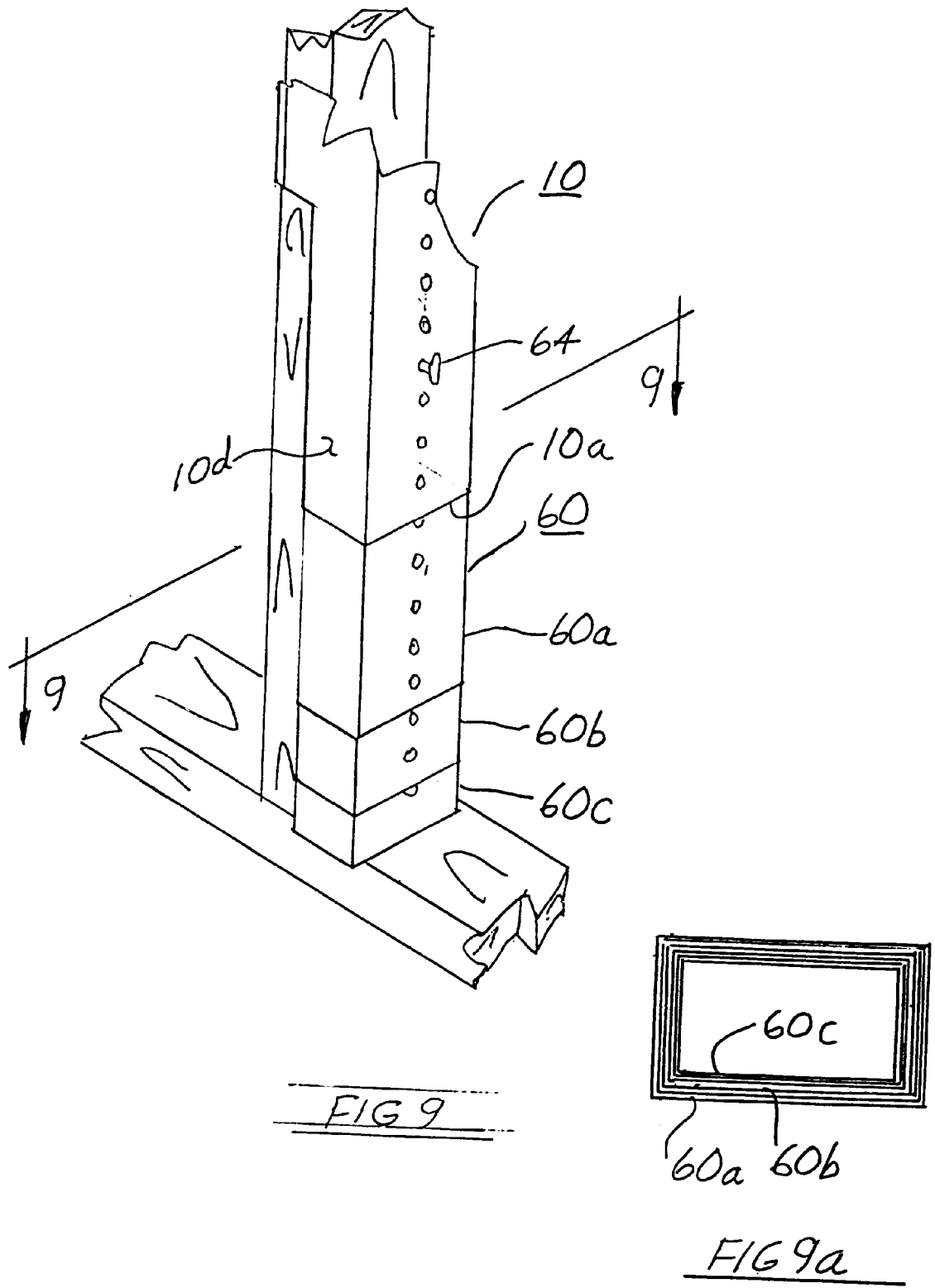
FIG. 9 is an isometric view of the portable cartridge apparatus, illustrating the use of the apparatus, to accommodate varying height requirements of junction box installation.
FIG. 9a is a section view taken from FIG. 9 along the lines 9—9.

Referring to FIG. 2, there is shown an enlarged view taken along the same lines as FIG. 1 in isometric form. The portable cartridge apparatus 10 is shown in position against the structural member 14, but it will be understood that it is necessary to manually hold the unit against that member. There is a manual grasping member 15 to facilitate the stationary positioning of the portable cartridge apparatus 10. The grasping member 15 is attached to the portable cartridge apparatus 10 via suitable screws, (not shown) accessed through a wall of the rectangular body of the portable cartridge apparatus wall members. For the purposes of clarity, and understanding of the components of the portable cartridge apparatus 10, a human hand is not shown holding the portable cartridge apparatus 10 in place in FIG. 2. To illustrate how a human hand does hold the portable cartridge apparatus 10, FIG. 3 does show the portable cartridge apparatus 10 held in the operating position. In FIG. 2, a dimension Q is shown and is representative of the dimension from the bottom plate (sole plate) to the bottom of an electric junction box being installed. This is adjustable as will be described later in this specification. Reference to FIG. 9 will elaborate on the adjustment.

FIG. 2 illustrates the details of the working components of the portable cartridge apparatus 10 that are manually actuated. As such, within FIG. 2, a portion of a junction box 26 is shown at a lower end 30 of the portable cartridge apparatus 10. There are two fastening elements 26a, and 26b installed in the junction box 26, both of which are shown protruding from the walls of the portable cartridge apparatus 10. FIG. 2a illustrates a typical junction box construction, in this case, box 26. The attitude illustrated of box 26 is the same as it is inside of the receiving chamber 11 of portable cartridge apparatus 10. The remaining junction boxes loaded into the portable cartridge apparatus 10 are visible in FIG. 2, (all ten not shown) as the associated fastening members that are attached to those boxes are seen protruding from the walls of the unit in this view. The box like shape and general construction of such junction boxes, otherwise known as outlet boxes or electrical boxes are well known in the contracting industry. They are available at most hardware stores or lumberyards in the electrical supply departments.

Junction box 26 is one of 10 similar boxes; all positioned within the receiving chamber 11 shown in FIG. 1, and the other views. Referring to the upper portion of FIG. 1, the boxes are confined by walls 10b, 10c, 10d, 10e and 10f defining the receiving chamber 11 of the portable cartridge apparatus 10. An elongated slot 34 separates walls 10b and 10c. The fastening elements of all loaded junction boxes such as box 26 with its nails 26a and 26b is seen protruding through the slot 34.

The walls 10b and 10c are supported and held together by a lower bridge member 10g and an upper bridge member 10h. The bridge members 10g and 10h are suitably fastened by welding or other means to walls 10b and 10c. Both bridge members 10g and 10h are constructed so that they have a slot 10k (FIG. 2), and 10l respectively positioned in line with the slot 34, thereby allowing the fastening members attached to all junction boxes to pass by in the operation of the portable cartridge apparatus 10. Typically as mentioned previously, all boxes supplied within the receiving chamber 11 are filled with similar fastening nails or other similar elements.

The boxes are typically supplied to the general electrical contractor with the attachment devices or nails pre-installed. Some may be provided without the fasteners, and as such may be loaded with suitable nails by hand prior to loading the boxes into the receiving chamber 11 of portable cartridge apparatus 10. When loaded, the boxes all are positioned so that one rests upon the other in the junction box receiving chamber 11. When the lowest box moves down within receiving chamber 11 it is because it is released by the actuating device described next When a box is released, accordingly, the remaining boxes follow in the descending direction.

Referring once again to FIG. 2, the working components of the portable cartridge apparatus 10 will now be described. The components to be described are located just to the right hand side of carrying handle 15. Handle 15 is used to transport the unit, and also to hold it in place during operation. There is an actuating lever 36, pivotable via rotation about a central stud 37 that is suitably secured to wall 10c of portable cartridge apparatus 10. The lever 36 has one end 36a that catches each lower fastening nail associated with a junction box to be released. In the drawing, this is fastening element (nail) 26b. The remainder of junction boxes will descend along the slot 34 as they follow the preceding box that has been positioned and installed on a wall member. Each junction box released is engaged by a pair of resilient members 10m and 10n. Members 10m and 10n are located and secured to appropriate walls of portable cartridge apparatus 10, within a dispensing chamber 10p. The members 10m and 10n are each suitably welded or otherwise fastened to wall members 10d and 10f respectively so that they will engage each box being dropped into the chamber 10p on activation of the lever 36.

Figure 3:
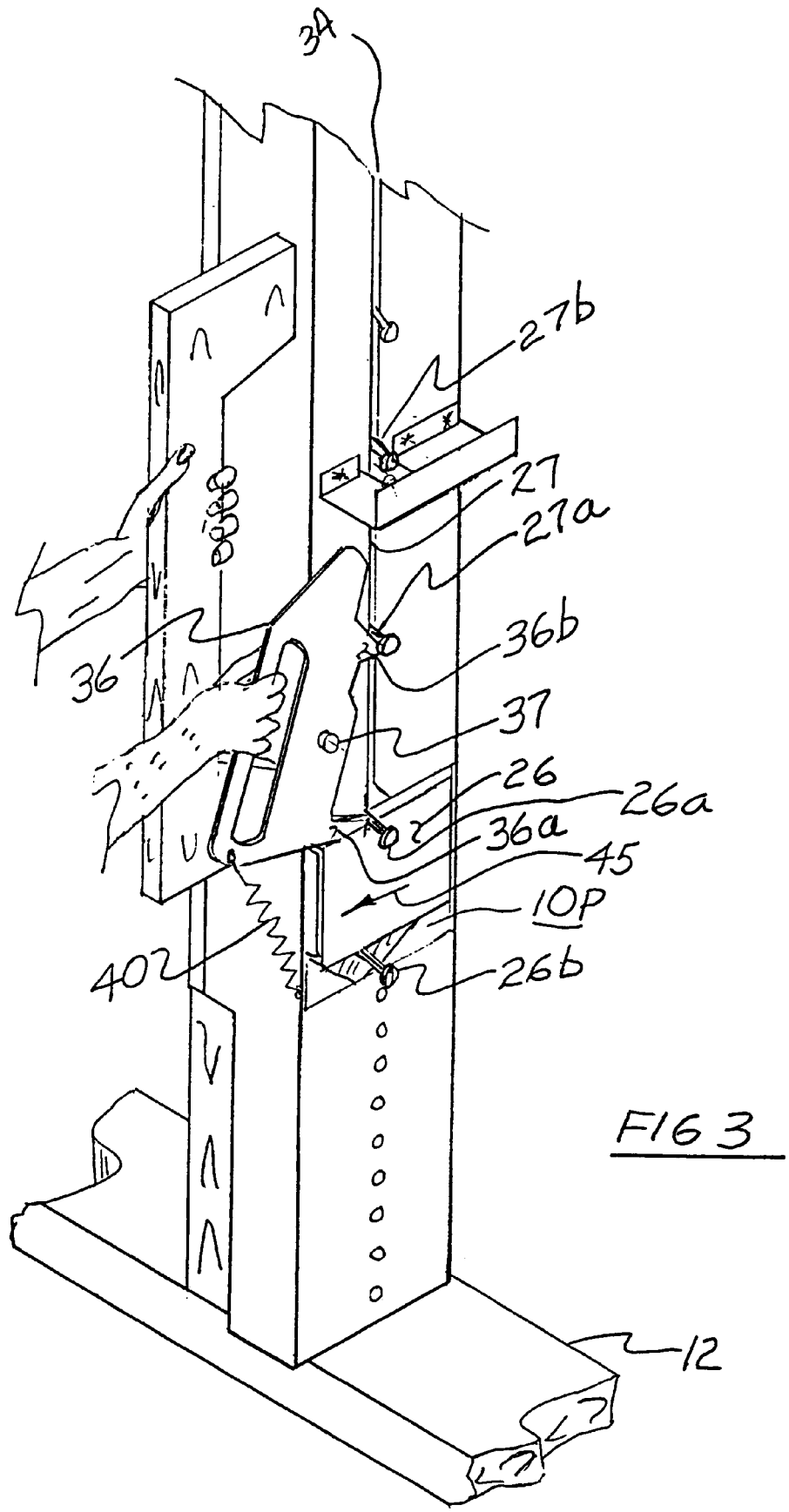
FIG. 3 is a view taken along the same lines and scale as FIG. 2, but with an operator's hands grasping the assembly. The operator's right hand in this case is releasing a junction box, the box having dropped into the access cavity of the assembly structure. Meanwhile, the operator's left hand is holding the portable cartridge apparatus against the wall member. The actuating member of the apparatus is restraining the upper supply of boxes.

In FIG. 3, the release of the lowest junction box 26 is seen being facilitated in order to bring that box into the position to install the box within dispensing chamber 10p. Box 26 is thus released from its supply position, seen in FIG. 2, when the end 36a of lever 36 disengages from the member 26b. At the same time, an end 36b of the lever 36 can be seen restraining a fastening member 27b of a second junction box 27. When the lever 36 is released from the position shown in FIG. 3, a biasing spring member 40 urges the lever 36 counter clockwise about stud 37 to the position shown in FIG. 2. The FIG. 2 position is the normal, home position of the lever 36, and where the second junction box 27 will now in turn be restrained via the end 36a of lever 36. The second box 27 will be released in another cycle, exactly as that described above, and so forth, until the operator has used up the supply of boxes in the portable cartridge apparatus 10, or the job is completed per electrical architectural design. The portable cartridge apparatus 10 has the capability of holding ten boxes, but this is not necessary in order for the contractor to complete a particular job. The exact number of boxes required for a given installation job of 10 or less boxes may be loaded instead.

Figure 4:
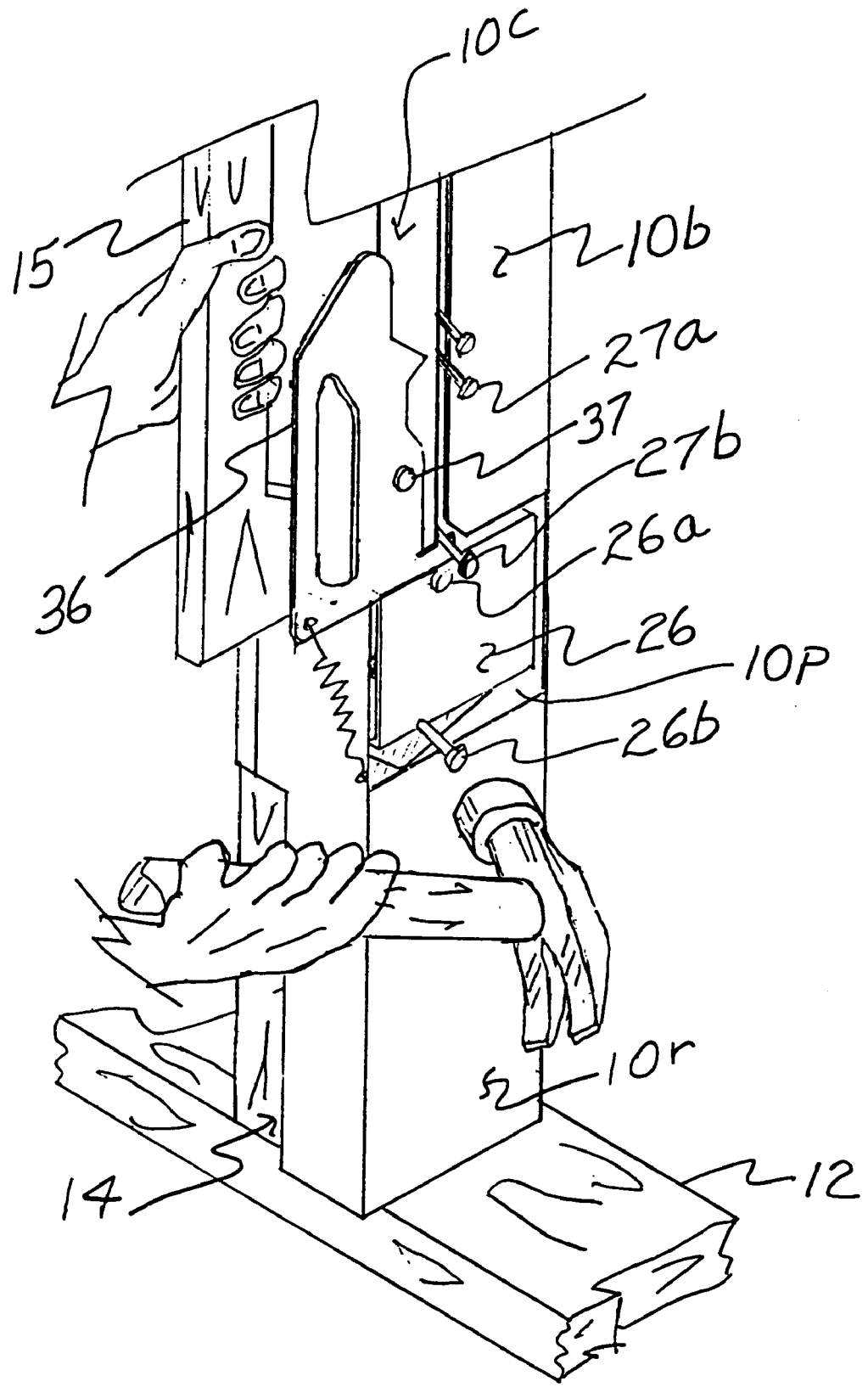
FIG. 4 is a view taken along the same lines as FIG. 3, showing the junction box being nailed in place. One nail has been set, and the other is about to be set

FIG. 4 illustrates the box 26 being nailed in place. The operator holds the portable cartridge apparatus 10 in position with the left hand, and can freely use a hammer to complete the installation process, one box at a time. Within the dispensing chamber 10p, the resilient member 10m is instrumental in causing the box 26 to register in the depth direction D shown in FIG. 5, and the height direction H shown in the same view for a typical installation. In FIG. 3, member 10m is registering box 26 in the direction of arrow 45; the general registration direction to insure each box conforms to dimension "D". This insures a consistent, accurate placement of each box at each wall element within the wall.

The exact position of a front surface 26c of the box 26 is determined by a spacer such as that shown in FIG. 8 and FIG. 8a The spacers are assembled to the portable cartridge apparatus 10 by the contractor who selects one to match the wall covering thickness. For an installation of depth to match the finished surface of ½" thick wallboard, a suitable spacer element 80 is used (FIG. 8). The use of varying spacer elements such as spacer 80 will be described a bit later in the specification. While the present invention describes the principal loading and installing process for electrical junction boxes using the moving lever 36, and associated components, an alternative design incorporates a hand actuator and release mechanism. A suitable latch device incorporated into the handle 15 to selectively release the boxes on requirement may form such an actuating device.

Figure 5:
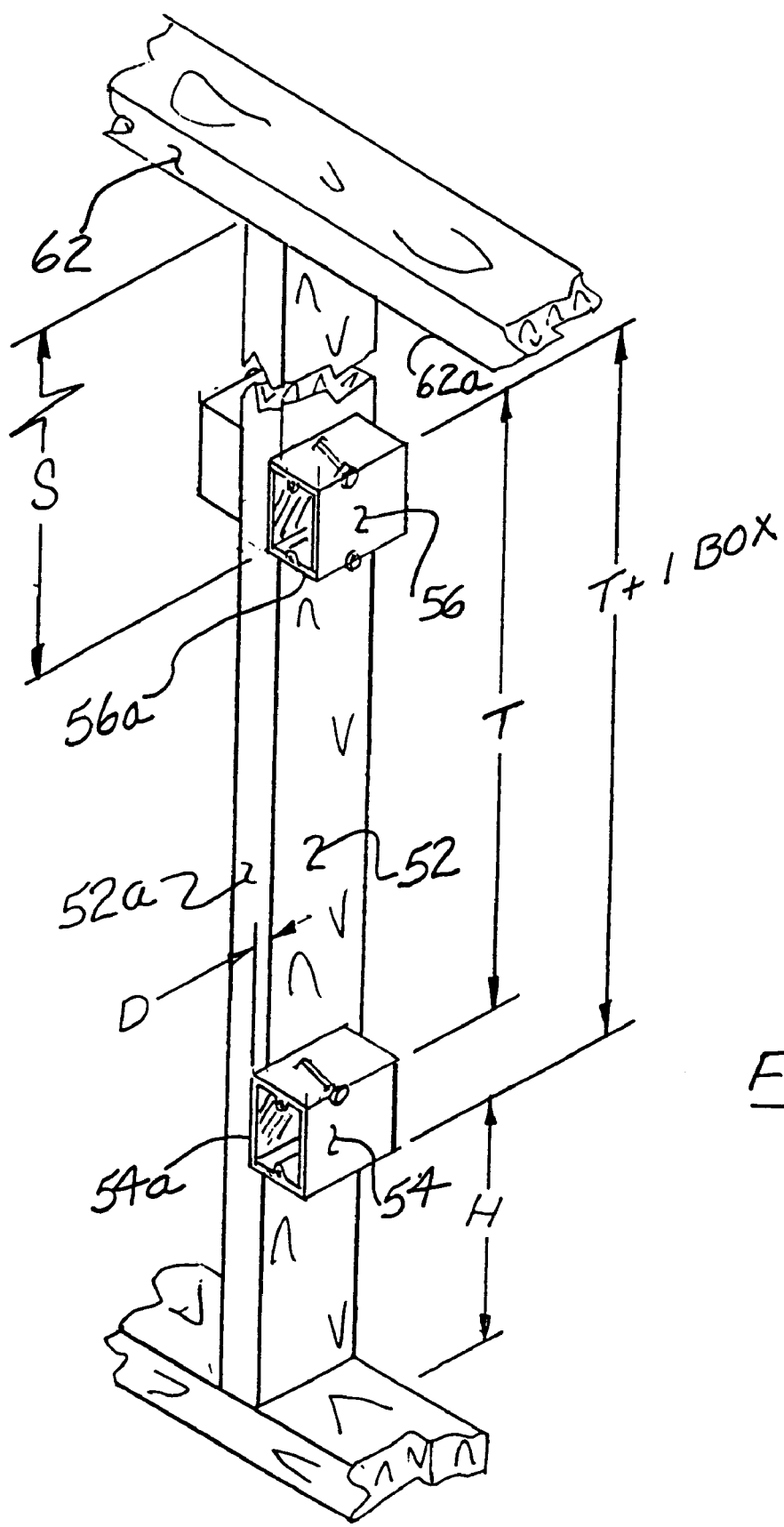
FIG. 5 is a view taken along the same lines as FIG. 1, without the portable cartridge apparatus in place. The junction box at the lower portion of the wall having been set at a correct height, depth, and lateral position. Another junction box is seen at a higher level, having been set after the lower one. In addition, yet another junction box is seen facing the opposite direction, that also having been set at an appropriate time when the portable cartridge apparatus was carried around to the opposite side of the building wall.

It is a typical requirement of the installation of such electrical boxes that they be installed at various elevated levels, such as floor level, at operator switch level or another special height requirement and design, following the architect's plan. To accomplish this with the portable cartridge apparatus 10 is a matter of adjusting the height at the bottom of the portable cartridge apparatus to fit the exact height dimension called for. To get different heights, a variable adjustment device 60 (FIG. 9) will be described, later in this specification. The variable adjustment device 60 fits into the space defined by receiving chamber 11 at the bottom end of the portable cartridge apparatus 10. Variable adjuster device 60 (FIG. 1) is pinned to the wall 10r, located at the bottom side of portable cartridge apparatus 10. The height can be set as meets the best height selection and requirement To meet the installation requirements of switch boxes, usually located at mid level heights of the wall, the following will now be described. Referring first to FIG. 1, there is an end 10s of wall 10b on the portable cartridge apparatus 10. The opposite topside of the portable cartridge apparatus 10 and all walls encompassing chamber 11 are defined by end 10t. A dimension T (FIG. 5) from end 10s, to the end 10t is the same as an overall dimension of ten stacked junction boxes, placed one on top of the other. The overall dimension of those ten boxes is measured from the bottom of the bottom box to the top of the upper box. That dimension is exactly the same as the dimension measured from the end 10t to the end 10s plus the height of one junction box, or otherwise defined as T+1 box. This is illustrated in FIG. 5 where an upper box and lower box are installed on a building member. This dimension T+1 works out perfectly to permit the portable cartridge apparatus 10 to initially be positioned at a lower level, and then to an upper level by raising the portable cartridge apparatus from the floor plate of the building wall to the ceiling plate of the same wall. Accordingly, the portable cartridge apparatus 10 is positioned immediately after a lower box installation to a higher location by lifting the portable cartridge apparatus 10 up in order to locate it at the lower surface of a wall plate 62.

Referring to FIG. 5 a single wall member 52 is shown with junction boxes installed to height dimension H. The wall member 52 has a lower junction box 54 installed, with a standard projection defined as D. There is also an upper, midlevel positioned box 56 installed to depth dimension D. Dimension D is measured from a front surface 52a of wall member 52 to an outer surface 54a and 56a of boxes 54 and 56 respectively in order to suit the outside wallboard cover. The portable cartridge apparatus 10 is used to install both boxes, the second box 56 installed by simply raising the portable cartridge apparatus 10 so that the upper end 10t (FIG. 1) of the portable cartridge apparatus 10 is located against a wall plate 62, at a surface 62a. The positioning of the portable cartridge apparatus 10 at the upper position is seen in FIG. 6, where an operators hand 68, and arm 70 is seen holding the unit up.

The process for releasing a junction box is the same for installing the mid-level application of boxes as it is for the base level described earlier. The advantage is that the portable cartridge apparatus 10 is in fact a gauge for several applications of junction boxes at different height levels with a minimum of handling and maneuvering of templates, or manual location and measurement requirements. The application of the lower level boxes is extremely f a whole set of 10 boxes may be applied in approximately 2 minutes, where the prior means for a manual installation is quite cumbersome, requiring set up and manipulation of the template to fit different height-and depth requirements. The great advantage of the portable cartridge apparatus is its repeating accuracy for location in respect to height from building element to element, and for perfect locations at two levels of applications on a given wall unit Referring now to FIG. 7, a top view of the portable cartridge apparatus 10 at end 10t is shown for the purpose of demonstrating the depth-locating feature included with the portable cartridge apparatus 10. In FIG. 7, the S shaped member 80 is seen, as it is fitted to an end 10v an extended abutment of the wall 10d described earlier. Member 80 is best described while referring to detail defined in FIG. 8 and 8a at this point In FIG. 8a, the member 80 is seen in an enlarged view. It is fabricated of a suitable extruded plastic, aluminum, or other metal material so that it has joined components 80a, 80b, 80c, and 80d. 80c and 80d are satisfactorily joined together by a bridge 80f, and a resulting space 80h is toleranced to securely fit by friction to the wall member 10v of portable cartridge apparatus 10. The member 80 may be formed so that a dimension X of the member fits the requirements of wallboard thickness of ½, ⅝, ¾ or other thickness of commercial manufacture. The member 80 is typically installed on the portable cartridge apparatus 10 prior to the installation of the electrical boxes, and is not changed unless the wall covering is thicker or thinner on the wall being installed with new junction boxes.

An alternative spacer 90 is shown in FIG. 8b. The spacer 90 is substantially C shaped, and is suited to fit the end 10v of wall 10d as previously described with respect to the spacer 80. A suitable slot 90h is designed to frictionally engage the end 10v as previously described for spacer 80.

Figure 8C:
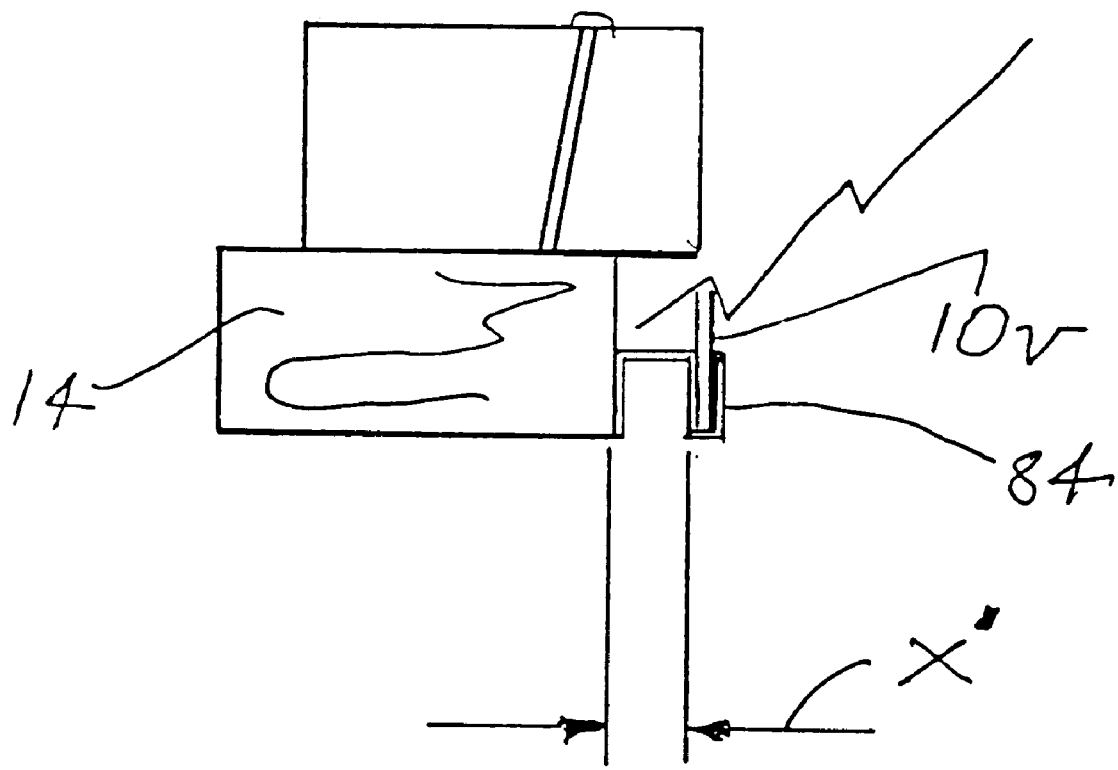
FIG. 8c is a view taken along the lines of FIG. 8 showing a slightly larger version of an adjusting spacer.

If there is a requirement for a different sized spacer, such as that seen in FIG. 8c, and defined by spacer member 84, the spacer 80 and 84 are easily interchanged on the portable cartridge apparatus 10. For the purposes of description, the spacer 84 may be ¾" in the direction of dimension X' as defined above with respect to the spacer member 80.

Referring now to FIG. 9, the height adjustment device 60 is seen as it may be applied to the portable cartridge apparatus 10. If, then should be a requirement for an outlet box at a height other than that determined by the portable cartridge apparatus 10 defined and described with FIG. 1, 2, 3, and 4, the device 60 will be used to accommodate the difference. A section view taken along the lines of 9—9 in FIG. 9 shows that the device 60 is assembled with three rectangular sections 60a, 60b, and 60c. The largest section 10a fits snuggly inside of portable cartridge apparatus 10 at end 10a, and the next section 60b fits snugly inside of section 60a, and the smallest section 60c fits snugly inside of section 60b. The three sections 60a, 60b, and 60c telescope together, and can be pinned together with a pin 64 with the wall of portable cartridge apparatus 10. There is a series of holes for the pin 64, the holes being spaced apart about 1 inch to accommodate 1 inch height adjustments as the case may be. The bottom of section 60c in this case rests upon a floor plate of a building wall, thereby establishing the reference for locating a junction box in the (unshown) receiving chamber 11 above of portable cartridge apparatus 10. If so desired, the device 60 may be slid entirely up until the bottom of all sections 60a, 60b, and 60c co-inside with the bottom edge 10a of portable cartridge apparatus 10.

DESCRIPTION OF A CYCLE OF OPERATION OF THE ELECTRICAL BOX INSTALLER

The operator of the portable cartridge apparatus 10 may follow a predetermined design of location of electrical boxes by simply walking along the uncovered wall of a structural wall unit and spraying paint representing a locator mark on the structural wall elements or studs that will receive an electrical box. The operator may then simply follow this design or pattern by moving the portable cartridge apparatus 10 from structural element to structural element, in quick progression, each box being nailed in place in a relatively short 20 to 30 second interval. The speed of installation will only vary by the dexterity of the operator using the installer, and perhaps the manual ability to nail the boxes that are positioned by the portable cartridge apparatus 10.

Referring to FIG. 1 and FIG. 3, the portable cartridge apparatus 10 is grasped by the manual grasping member 15, and positioned in place adjacent to a receiving wall member. At the first stud of wall member marked, the unit is located on an upper surface 12a of the floor plate 12. The portable cartridge apparatus is laterally positioned so that the outside of wall 10e is flush against a surface 12b of the wall element 12. The bottom end 10a of the portable cartridge apparatus 10 is positioned against the upper surface 12a of the plate 12 at the same time. Lever 36 is then grasped with one hand, and rotated clockwise to release the junction box 26 from it's stored position within the chamber 11. The box 26 immediately drops from its stored position within chamber 11 when the end 36a of lever 36 disengages from the fastening member 26a. Box 26 descends, and engages the member 10m and 10n. The member 10m cause registration of the box 26 towards the front in direction 45.

While box 26 drops to dispensing chamber 10p which is the ready position, i.e. the position within the receiving chamber 11 at which the box can be installed, the following box 27 is held in place by the end 36b of lever 36 as seen in FIG. 3. When the operator removes the hand holding the lever 36, the biasing member 40 returns the lever 36 to its home position (FIG. 2). Here, the end 36b of lever 36 no longer holds up the lower end of the box 27, and he box 27 now drops to the ready position in dispensing chamber 10p, which is the position at which the box can be installed, seen in FIG. 2.

The position of the box 26 is predetermined when the operator selects a desired wall covering defined by dimension D described above. The height is also predetermined and defined as dimension H on the wall member, substantially the same and comparable to a dimension defined from surface 10q on the portable cartridge apparatus 10, and the bottom end 10a of the portable cartridge apparatus 10. If another dimension other than H is desired, the adjusting means will accommodate that In the present description of operation, the one half-inch spacer 80 is selected and positioned on the wall member 14. The spacer 80 is attached to the portable cartridge apparatus 10 as previously described above.

With the box 26 positioned properly, the operator is able to nail it in place as seen in FIG. 4. After nailing the box in place the portable cartridge apparatus 10 is then moved lateral to the right, and away from the building wall element and the installed box so that the next cycle can be made.

The preceding description of the components of the electrical junction box installer is felt to be descriptive of the preferred embodiment of this design. It is expected that other modifications in assembly, or fabrication of the components and nature of the device may be considered by those skilled in the art without departing from the spirit and scope of the invention. It is not intended to limit the invention to the exact construction and operation shown and described.

What is claimed is:

1. A portable cartridge holding apparatus for holding, locating and dispensing electrical junction boxes, comprising:

an elongate receptacle, having grasping means and being open at one end for accepting a supply of junction boxes;

an actuating member operatively connected to said elongate receptacle to enable a release from said supply an individual junction box to a ready position in a dispensing chamber for registration and installation to a construction element of said building wall while holding the remainder of said supply of junction boxes in a stored position within a receiving chamber for a next dispensing cycle of a following junction box;

first biasing means connected to said actuating member to maintain said actuating member in a position for releasing said individual junction box from said stored position in said receiving chamber to said ready position in said dispensing chamber; and second biasing means associated with said receiving chamber to register and locate said individual junction box to a predetermined depth position with respect to said building element.

2. A portable cartridge apparatus as recited in claim 1 wherein said first biasing means includes a tension spring attached to said actuating member and a wall of said elongated receptacle.

3. A portable cartridge holding apparatus as recited in claim 1 wherein said second biasing means includes a resilient member attached to a wall of said elongated receptacle.

4. A portable cartridge holding apparatus for holding, locating and dispensing electrical junction boxes, comprising:

an elongate receptacle, having grasping means and being open at one end for accepting a supply of junction boxes in a receiving chamber;

an actuating member operatively connected to said elongate receptacle to enable a release from said supply an individual junction box to a dispensing chamber for registration and installation to a construction element of said building wall while holding the remainder of said supply of junction boxes in a position for a next dispensing cycle of a following junction box;

first biasing means connected to said actuating member to maintain said actuating member in a position for releasing said individual junction box;

second biasing means associated with said receiving chamber to register and locate said individual junction box to a predetermined depth position with respect to said building element; and first dimension of said receiving chamber of said elongate receptacle being constructed with a length to hold said supply of junction boxes wherein said first dimension is equal to a predetermined dimension measured between a top end of said receptacle and a bottom end of said receiving chamber of said receptacle and said dimension is further equal to a second dimension between any two electrical boxes installed on said wall member, said second dimension being equal to the distance measured between a top of an upper electrical box, and the bottom of a lower electrical box installed on said wall member.

5. A portable cartridge apparatus as recited in claim 4 wherein said first dimension of said receiving chamber of said elongate receptacle is equal to the stacked overall height of ten electrical junction boxes.

6. A portable cartridge loading apparatus for holding, locating and dispensing electrical junction boxes, comprising:

an elongate receptacle, having grasping means and being open at one end for accepting a supply of junction boxes in a receiving chamber;

an actuating member operatively connected to said elongate receptacle to enable a release from said supply, one junction box, while holding the remainder of said supply of junction boxes in a position for a next dispensing cycle;

first biasing means connected to said actuating member to maintain said member in a position for releasing a next junction box;

second biasing means associated with said receiving chamber to register and locate said individual junction box in said dispensing chamber to a predetermined depth position with respect to said building element;

a portion of said elongate receptacle having an elongated extension of said elongate receptacle and a replaceable locating member fitting said extension for positioning said junction boxes in an alternate selected depth dimension with respect to said building wall;

a variable adjustment assembly that engages a lower end of said elongate receptacle to enable changeable height dimensions of said loading apparatus.

7. A portable cartridge apparatus as recited in claim 6 wherein said variable adjustment assembly comprises:

a series of rectangular shaped box members fitting one inside the other, the largest of which fits inside of the corresponding shape of said loading apparatus.

8. A portable cartridge loading apparatus as recited in claim 6 wherein said rectangular shaped box members have a series of linearly disposed adjustment apertures that correspond to each other at assembly and are fastened together by a pinning member according to a preselected height requirement.

9. A portable cartridge loading apparatus as recited in claim 6 wherein said replaceable locating member is substantially S shaped.

10. A portable cartridge loading apparatus as recited in claim 6 wherein said replaceable locating member is substantially C shaped.

* * * * *